United States Patent
Nishida et al.

(10) Patent No.: US 8,217,624 B2
(45) Date of Patent: Jul. 10, 2012

(54) POWER STORAGE SYSTEM (75) Inventors: Takehiko Nishida, Nagasaki (JP);
Katsuaki Kobayashi, Nagasaki (JP);
Katsuo Hashizaki, Nagasaki (JP);
Hidehiko Tajima, Nagasaki (JP);
Kazuyuki Adachi, Fukuoka (JP)

(73) Assignees: Mitsubishi Industries, Ltd., Tokyo (JP);
Kyushu Electric Power Co., Inc.,
Fukuoka-shi, Fukuoka (JP)

( * ) Notice: Subject to any disclaimer, the term of this patent is extended or adjusted under 35 U.S.C. 154(b) by 367 days.

(21) Appl. No.: 12/527,738

(22) PCT Filed: Mar. 14, 2008

(86) PCT No.: PCT/JP2008/054770
§ 371 (c)(1),
(2), (4) Date: Aug. 19, 2009

(87) PCT Pub. No.: WO2008/114734
PCT Pub. Date: Sep. 25, 2008

(65) Prior Publication Data
US 2010/0033135 A1    Feb. 11, 2010

(30) Foreign Application Priority Data

Mar. 15, 2007  (JP) ................................ 2007-066790

(51) Int. Cl.
*H02J 7/00*    (2006.01)
(52) U.S. Cl. ........................ 320/118; 320/136; 320/119
(58) Field of Classification Search .................. 320/118, 320/119, 136
See application file for complete search history.

(56) References Cited

U.S. PATENT DOCUMENTS

| | | | |
|---|---|---|---|
| 5,469,042 A | 11/1995 | Ruhling | |
| 5,939,861 A * | 8/1999 | Joko et al. | 320/122 |
| 6,075,346 A | 6/2000 | Kikuchi et al. | |
| 6,255,803 B1 | 7/2001 | Ishihara et al. | |
| 6,388,426 B1 | 5/2002 | Yokoo et al. | |

(Continued)

FOREIGN PATENT DOCUMENTS

CN    1835330 A    9/2006

(Continued)

OTHER PUBLICATIONS

International Search Report of PCT/JP2008/054770, Mailing Date of Jun. 24, 2008.

(Continued)

*Primary Examiner* — M'Baye Diao
(74) *Attorney, Agent, or Firm* — Westerman, Hattori, Daniels & Adrian, LLP (57) ABSTRACT

An object is to improve safety. Provided is a power storage system including a battery apparatus 1; a power converter 2 provided between the battery apparatus 1 and a load 3 and that can control power supplied from the battery apparatus 1 to the load 3; and a battery monitoring circuit 4 that detects an abnormality in the battery apparatus 1. When an abnormality in the battery apparatus 1 is detected by the battery monitoring circuit 4, the power converter 2 supplies power stored in the battery apparatus 1 to the load 3 or to an internally provided internal load at or below a current value or power value that is set in advance, or alternatively, at a current value or power value that the load 3 demands, within a range that does not exceed an upper limit that is set in advance.

9 Claims, 7 Drawing Sheets

U.S. PATENT DOCUMENTS

| | | | |
|---|---|---|---|
| 6,404,165 B1 * | 6/2002 | Shinpo et al. | 320/116 |
| 6,664,000 B1 | 12/2003 | Sonobe | |
| 7,495,417 B2 | 2/2009 | Ishishita | |
| 7,746,031 B2 * | 6/2010 | Ishishita | 320/132 |
| 7,989,106 B2 * | 8/2011 | Kinoshita et al. | 429/211 |
| 2004/0232879 A1 | 11/2004 | Wang et al. | |
| 2005/0140336 A1 * | 6/2005 | Anzawa et al. | 320/118 |
| 2006/0208708 A1 | 9/2006 | Ishishita | |
| 2009/0228221 A1 * | 9/2009 | Kakiuchi et al. | 702/58 |

FOREIGN PATENT DOCUMENTS

| | | |
|---|---|---|
| JP | 6-57050 U | 8/1994 |
| JP | 2001-025173 A | 1/2001 |
| JP | 2001-95158 A | 4/2001 |
| JP | 2001-110457 A | 4/2001 |
| JP | 2001-298867 A | 10/2001 |
| JP | 2003-142162 A | 5/2003 |
| JP | 2003-219510 A | 7/2003 |
| JP | 2004-166344 A | 6/2004 |
| JP | 2004-254385 A | 9/2004 |
| JP | 2006-67688 A | 3/2006 |
| JP | 2007-37227 A | 2/2007 |
| WO | 2008/032945 A1 | 3/2008 |

OTHER PUBLICATIONS

European Search Report dated Mar. 21, 2011, issued in corresponding European Patent Application No. 08 72 2166.

Chinese Office Action dated May 20, 2011, issued in corresponding Chinese Patent Application No. 200880006416.7.

Office Action issued on Dec. 31, 2011 in corresponding Chinese Patent Application 200880006416.7. English Translation.

European Office Action dated May 3, 2012, issued in corresponding application 08 722 166.9 (4 pages).

* cited by examiner

POWER STORAGE SYSTEM

TECHNICAL FIELD

The present invention relates to protection of a battery apparatus.

BACKGROUND ART

In battery packs provided with one or multiple secondary batteries in the known related art, when a battery abnormality is detected, charging of the secondary battery is stopped, and the secondary battery is connected to a resistance to automatically discharge the secondary battery (for example, see Patent Documents 1, 2, and 3). When such an abnormality occurs, because the energy stored in the battery pack is discharged, it is possible to maintain the battery pack in a safe state.

Patent Document 1:
Japanese Unexamined Patent Application, Publication No. 2001-298867
Patent Document 2:
Japanese Unexamined Patent Application, Publication No. 2003-142162
Patent Document 3:
Japanese Unexamined Utility Model Application, Publication No. HEI-6-57050.

DISCLOSURE OF INVENTION

However, in the conventional method described above, because the discharge current is determined by the terminal voltage of the secondary battery and the discharge resistance, the discharge current is reduced, and there is a problem in that it takes some time to discharge to a safe state. Also, depending on the charging state of the secondary battery, there is a risk of the discharge current becoming greater than a permissible current value, which is undesirable from the viewpoint of heat generation and so forth.

The present invention has been conceived to solve the problems described above, and an object thereof is to provide a power storage system that can achieve improved safety.

In order to solve the problems described above, the present invention provides the following solutions.

A first aspect of the present invention is a power storage system including a battery apparatus; a power converter that is provided between the battery apparatus and a load and that can control power supplied from the battery apparatus to the load; and a battery monitoring circuit that detects an abnormality in the battery apparatus, wherein when an abnormality in the battery apparatus is detected by the battery monitoring circuit, the power converter supplies power stored in the battery apparatus to the load or to an internally provided internal load at or below a current value or power value that is set in advance, or alternatively, at a current value or power value that the load demands, within a range that does not exceed an upper limit that is set in advance.

With this configuration, when an abnormality in the battery apparatus is detected by the battery monitoring circuit, discharging of the battery apparatus is performed by the power converter, and therefore, the voltage of the battery apparatus can be reduced. Accordingly, the battery apparatus can be maintained in a safe state. Because the discharge current at this time can be restricted to or less than a current value or power value that is set in advance, or alternatively, to a current value or power value that the load requires, within a range that does not exceed an upper limit that is set in advance, it is possible to reduce the voltage of the battery apparatus while ensuring safety.

The power storage system described above may further comprise a switching unit that electrically connects and disconnects the battery apparatus and the power converter, wherein, when the voltage of the battery apparatus is at or below a predetermined value, the battery monitoring circuit operates the switching unit to cut the electrical connection between the battery apparatus and the power converter.

With this configuration, when the voltage of the battery apparatus is less than or equal to the predetermined value, the switching unit is operated to cut the electrical connection between the battery apparatus and the power converter.

The power storage system described above may further include a temperature detector that detects the temperature of the battery apparatus, wherein the power converter varies a discharge current value according to the temperature of the battery apparatus.

With this configuration, because the current value of the discharge current is varied according to the temperature of the battery apparatus, it is possible to further improve safety by setting a small current value of the discharge current when the temperature is high.

In the power storage system described above, when the temperature of the battery apparatus reaches an upper temperature limit, the power converter may stop discharging.

With this configuration, the temperature rise can be suppressed.

In the power storage system described above, the battery apparatus may include a plurality of battery cells connected in series; each battery cell may be provided with a voltage equalizing circuit that is controlled by the battery monitoring circuit; and when the terminal voltage of the battery apparatus is at or below a predetermined value due to discharging being performed by the power converter, the battery monitoring circuit may operate each of the voltage equalizing circuits.

In the power storage system described above, the battery apparatus may include a plurality of battery cells connected in series; each battery cell may be provided with a voltage equalizing circuit that is controlled by the battery monitoring circuit; and after discharging is stopped once the temperature of the battery cell reaches the upper temperature limit, each of the voltage equalizing circuits may be operated.

With this configuration, it is possible to separately perform discharging of each battery cell. As a result, nonuniform voltages among the battery cells can be eliminated.

A second aspect of the present invention is a power storage system including a battery apparatus including a plurality of battery cells connected in series; voltage equalizing circuits, provided in correspondence to each battery cell, that equalize cell voltages among the battery cells; and a battery monitoring circuit that detects an abnormality in each battery cell, wherein when the battery monitoring circuit detects an abnormality in the battery cells, at least the battery equalizing circuit corresponding to the battery cell in which the abnormality is detected is operated to perform discharging of the battery cell in which the abnormality is detected at or below a current value that is set in advance.

With this configuration, when a battery cell abnormality is detected, discharging of at least the battery cell in which the abnormality is detected is performed at or below a current value set in advance. Therefore, safety of the battery cell can be ensured.

The power storage system described above may further include a temperature detector that detects the temperature of each of the battery cells, wherein the battery monitoring circuit may control a discharge current value according to the temperatures of the battery cells.

With this configuration, because the current value of the discharge current is varied according to the temperature of the battery cell, it is possible to further improve safety by setting a small current value of the discharge current or by stopping discharging when the temperature is high.

In the power storage system described above, as the voltage equalizing circuit, it is possible to use, for example, a transformer-type circuit that supplies the energy in the battery cell in which the abnormality is detected to another normal battery cell via a transformer.

It is possible to use a combination of the aspects described above, within the permissible scope.

The present invention affords an advantage in that safety can be improved.

EXPLANATION OF REFERENCE SIGNS 1 battery apparatus
2, 2' power converter
3 load
4, 4' battery monitoring circuit
5, 12 switching device
6 internal load
7 cell balance circuit
10, 10' battery unit
11 resistance

BEST MODE FOR CARRYING OUT THE INVENTION

An embodiment of a power storage system according to the present invention will be described below with reference to the drawings.

First Embodiment

Figure 1:
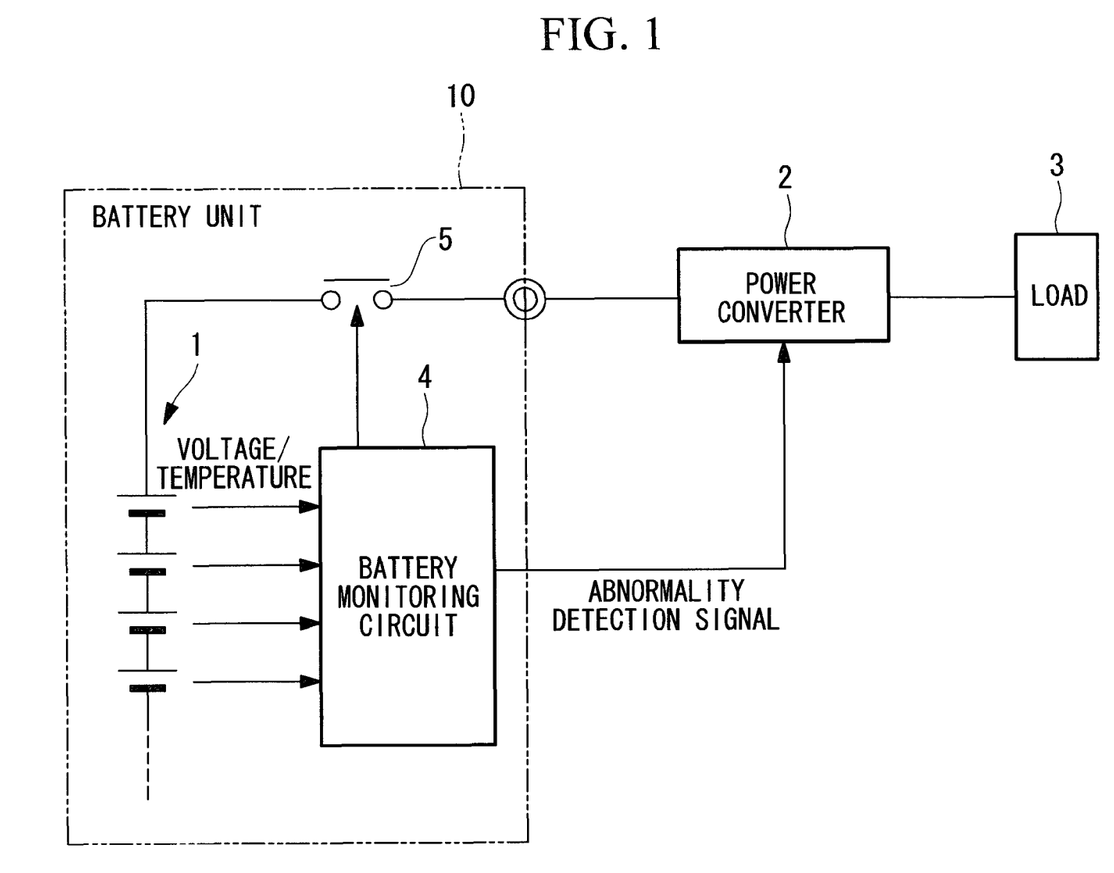
FIG. 1 is a diagram showing, in outline, the configuration of a power storage system according to a first embodiment of the present invention.

FIG. 1 is a diagram showing, in outline, the configuration of a power storage system according to a first embodiment of the present invention.

As shown in FIG. 1, the power storage system according to this embodiment includes a battery apparatus 1, a power converter 2 that is disposed between the battery apparatus 1 and a load 3 and that can control the power supplied from the battery apparatus 1 to the load 3, a battery monitoring circuit 4 that detects an abnormality in the battery apparatus 1, and a switching device (switching unit) 5 that electrically connects and disconnects the battery apparatus 1 and the power converter 2.

The battery apparatus 1, the battery monitoring circuit 4, and the switching device 5 are accommodated in a common casing to form a battery unit 10.

The battery apparatus 1 includes a plurality of battery cells connected in series. Each battery cell is provided with a voltage sensor (not shown in the drawings) that detects the voltage of the battery cell and a temperature sensor (not shown in the drawings) that detects the temperature. The detection results from the voltage sensor and the temperature sensor are supplied to the battery monitoring circuit 4.

The battery monitoring circuit 4 detects an abnormality when the voltage value received from the voltage sensor is outside a normal voltage range that is set in advance and outputs an abnormality detection signal to the power converter 2. For example, when there is battery cell whose terminal voltage is outside the voltage range from 2.3 V or more to less than 4.3 V, the battery monitoring circuit 4 outputs the abnormality detection signal to the power converter 2.

The battery monitoring circuit 4 detects an abnormality when the temperature received from the temperature sensor is equal to or greater than a limit value that is set in advance and outputs an abnormality detection signal to the power converter 2. For example, when there is a battery cell at 80° C. or above, the battery monitoring circuit 4 outputs the abnormality detection signal to the power converter 2.

The above-described normal voltage range of the terminal voltage of the battery cell and the temperature limit value can be arbitrarily set according to the design.

The power converter 2 supplies the load 3 with the power stored in the battery apparatus 1 of the battery unit 10 according to a preset sequence. Here, the power converter 2 may be a unidirectional power converter, or it may be a bidirectional power converter.

The power converter 2 is provided with, for example, a function for controlling the voltage and current from the battery apparatus 1 to desired values, and an inverter function for converting DC power from the battery apparatus 1 into three-phase AC power to be output. This power converter 2 is an apparatus that is generally provided in power storage systems, such as those that supply the load 3 with power from the battery apparatus 1 equipped with a plurality of battery cells.

For example, when the power storage system of this embodiment functions as a power storage system for domestic or commercial use, the power converter 4 functions as an apparatus that converts the power from the battery unit 10 from DC to three-phase AC and supplies it to the load 3 with the voltage, current, power factor, etc. controlled to desired values. When the power storage system of this embodiment functions as a battery in an electric vehicle etc. the power converter 2 functions as an apparatus that converts the power from the battery unit 10 from DC to three-phase AC and supplies it to the load 3 of a drive motor etc. while performing voltage and current control.

During normal operation, the power converter 2 supplies power from the battery unit 10 to the load 3 on the basis of a preset sequence, a power demand command, etc. When the abnormality detection signal is received from the battery monitoring circuit 4, the power converter 2 stops supplying power from the battery unit 10 to the load 3, and then performs discharging of the battery apparatus 1 by supplying power to the load 3 from the battery apparatus 1 at or below a first current value that is set in advance (for example, a current value about 1/10th of the rated current).

Next, the operation of the power storage system of this embodiment having the above configuration will be described.

Power from the battery apparatus 1 in the battery unit 10 is supplied to the load 3 under the control of the power converter 2. At this time, in the battery unit 10, the terminal voltage and temperature of each battery cell are detected at predetermined time intervals by the voltage sensor and the temperature sensor and are sent to the battery monitoring circuit 4.

The battery monitoring circuit 4 determines whether the terminal voltage of each battery cell is within the preset normal voltage range, and whether the temperature of each battery cell is less than the preset limit value. As a result thereof, if the voltage of any battery cell is outside the normal voltage range, or if the temperature of any battery cell is greater than or equal to the limit value, the abnormality detection signal is sent from the battery monitoring circuit 4 to the power converter 2.

Upon receiving the abnormality detection signal, the power converter 2 stops supplying power from the battery unit 10 to the load 3, and then performs discharging of the battery apparatus 1 by supplying power from the battery apparatus 1 to the load 3 at or below the first current value that is set in advance.

In this case, because the power supplied to the load 3 is significantly less than that during normal operation, the number of connected loads 3 and the operational state or usage state of the load 3 may be restricted according to the discharge current.

The terminal voltage and temperature of each battery cell are also detected in the period during which the above-mentioned discharging is performed by the power converter 2 and are sent to the battery monitoring circuit 4. When the average terminal voltage of the battery cells becomes equal to or less than a discharge stopping voltage that is set in advance, the battery monitoring circuit 4 outputs a discharge stopping signal to the power converter 2. Upon receiving the discharge stopping signal, the power converter 2 stops discharging and sends a discharge completion signal indicating that discharge is stopped to the battery monitoring circuit 4. Upon receiving the discharge completion signal from the power converter 2, the battery monitoring circuit 4 sets the switching device 5 to the open state to cut the electrical connection between the battery apparatus 1 and the power converter 2.

As described above, with the power storage system according to this embodiment, when a battery abnormality is detected, the power converter 2 performs discharging of the battery apparatus 1 to reduce the voltage of the battery apparatus 1; therefore, it is possible to separate the battery apparatus 1 from the power converter 2 in a highly safe state, and it is also possible to maintain a highly safe battery state.

Furthermore, because the discharge current is at or below the first current value, it is possible to discharge the energy stored in the battery apparatus 1 while ensuring safety.

With the power storage system according to this embodiment, the value of the discharge current is controlled to a value at which safety is ensured. Instead of this, however, discharging may be performed within a range of powers at which safety is ensured. Instead, power may be supplied from the battery apparatus 1 to the load 3 at a current value or power value according to the demand on the load 3, within in a range that does not exceed an upper limit set in advance. In this case, the power range or the upper limit of the current value or the power value can be arbitrarily set according to the design.

In this embodiment, when the average value of the terminal voltage of each battery cell is at or below a predetermined value (for example, 3.1 V), the battery monitoring circuit 4 sends the discharge stopping signal. Instead of this, the battery monitoring circuit 4 may send the discharge stopping signal when the highest terminal voltage among the plurality of battery cells is at or below a predetermined value (for example, 3.1 V), or when the lowest terminal voltage is at or below a predetermined value (for example, 3.1 V).

Also, the battery monitoring circuit 4 may send the discharge stopping signal when the terminal voltage of the battery apparatus 1, not the battery cells, is at or below a predetermined value (for example, 3.1 V×the number connected in series).

This embodiment has been described in terms of a case where the battery apparatus 1 has a plurality of battery cells connected in series. Instead of this, however, the battery apparatus 1 may be formed of a single battery cell. The power storage system according to this embodiment may be configured so as to discharge the battery apparatus 1 to ground, instead of via the load 3.

Second Embodiment

Figure 2:
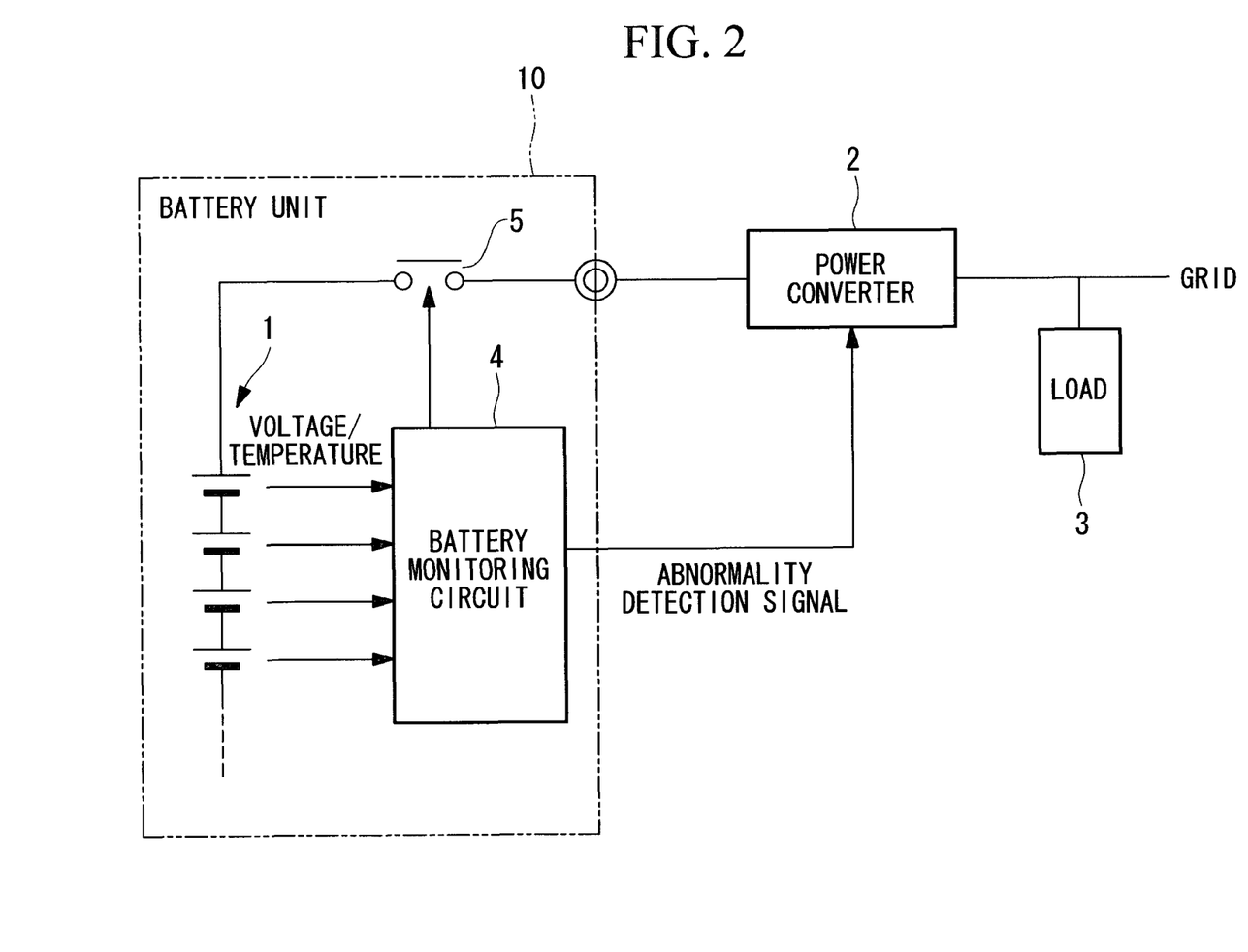
FIG. 2 is a diagram showing, in outline, a power storage system according to a second embodiment of the present invention.

Next, a power storage system according to a second embodiment of the present invention will be described with reference to FIG. 2.

The power storage system according to the first embodiment described above is configured such that the battery unit 10 is connected via the power converter 2 to the load 3; however, the power storage system according to this embodiment is configured such that the battery unit 10 is connected via the power converter 2 to the load 3 and a grid.

With this configuration, when performing discharging of the battery apparatus 1 in the event of an abnormality, it is possible to supply a shortfall in power from the grid to the load 3. Accordingly, the operational state or the usage state of the load 3 can be maintained similar to normal operation.

A configuration in which another battery apparatus is connected instead of the grid, or in addition to the grid, is also permissible. In this case, the shortfall in power may be supplied to the load 3 from the other battery apparatus.

Figure 3:
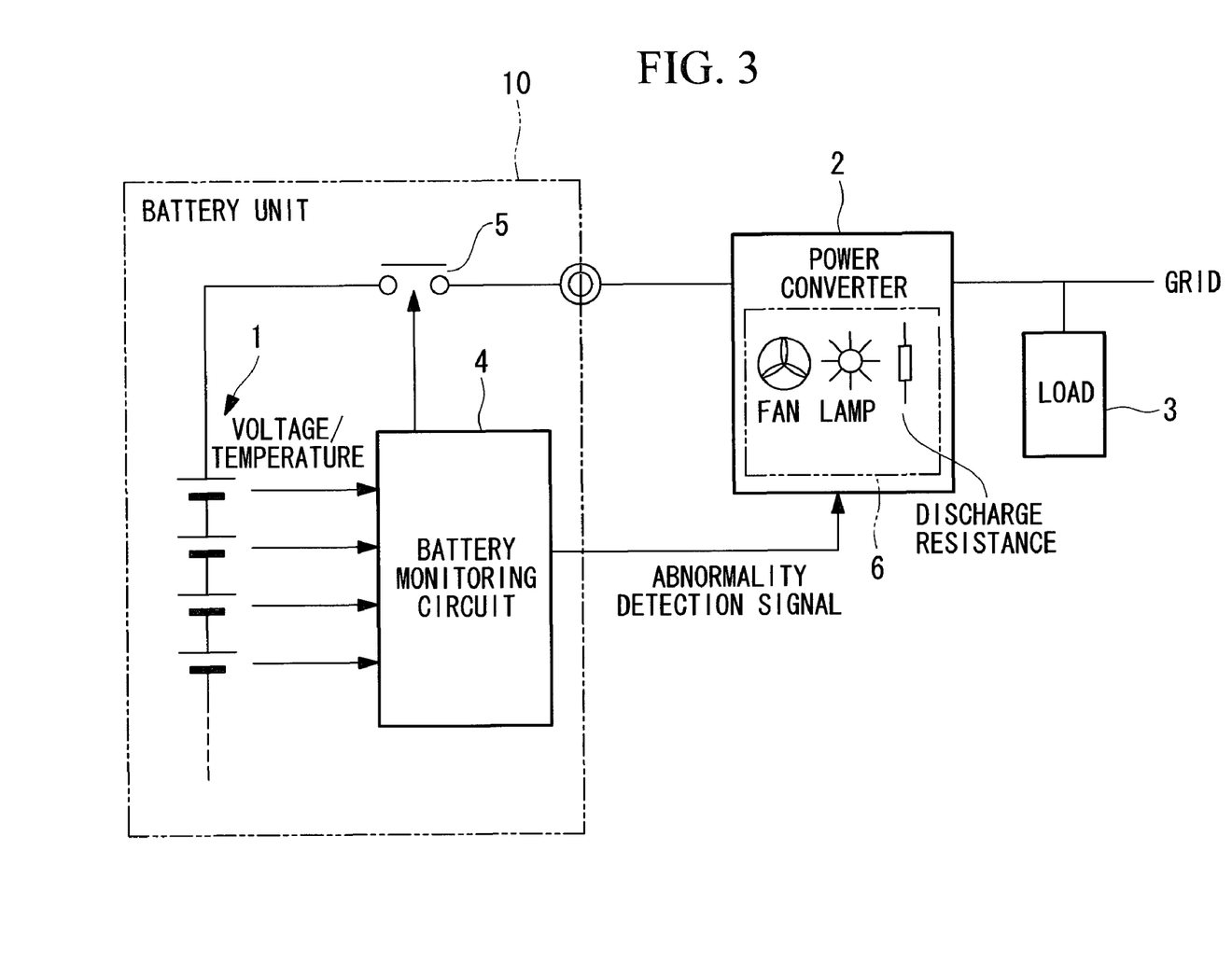
FIG. 3 is a diagram showing a modification of the power storage system shown in FIG. 2.

In this embodiment, when an abnormality in a battery cell is detected, the power from the battery apparatus 1 is supplied to the load 3. Instead of this, however, as shown in FIG. 3 for example, the power from the battery apparatus 1 may be supplied to an internal load 6 (for example, a fan, a lamp, a discharge resistance, etc.) in the power converter 2. In this case, the power from the battery apparatus 1 is consumed by the internal load 6 in the power converter 2.

Third Embodiment

Figure 4:
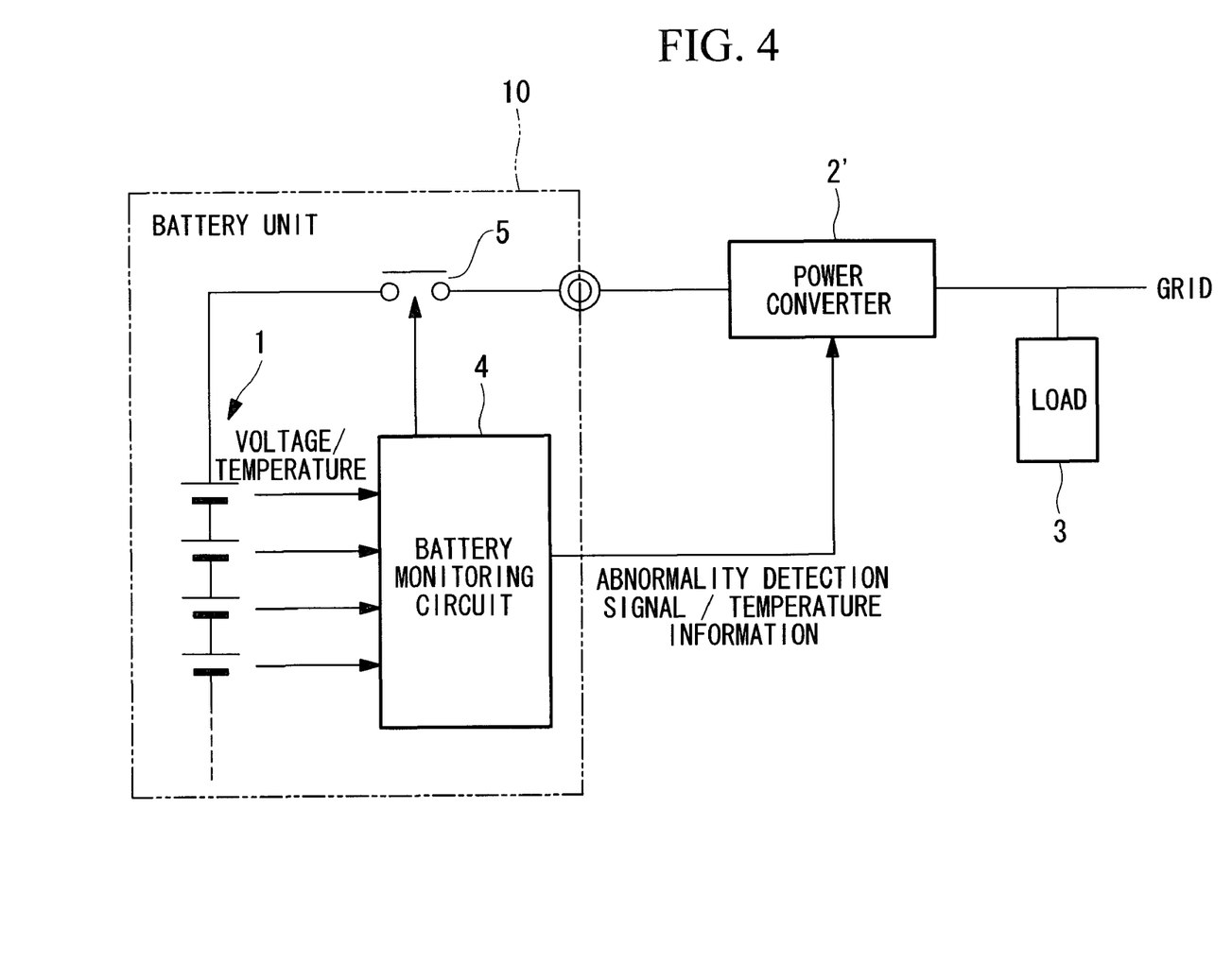
FIG. 4 is a diagram showing, in outline, a power storage system according to a third embodiment of the present invention.

Next, a power storage system according to a third embodiment of the present invention will be described with reference to FIG. 4.

The power storage system according to this embodiment has substantially the same configuration as the power storage system according to the second embodiment described above, but differs in that temperature information of the battery cells is sent from the battery monitoring circuit 4 to a power converter 2', and the power converter 2' varies the discharge current on the basis of this temperature information.

In the following, the power storage system according to this embodiment is described mainly in terms of the differences from the power storage system according to the second embodiment described above.

When the battery monitoring circuit 4 detects an abnormality in a battery cell, it outputs an abnormality detection signal and temperature information of each battery cell to the power converter 2'.

When the temperature of any battery cell is greater than or equal to a first preset value (for example, 60° C.) that is set in advance, the power converter 2' performs discharging at a second current value (for example, a current at which the temperature falls gradually to 1/20, 1/30, 1/40 . . . of the rated value) that is smaller than the first current value (for example, a value about 1/10 of the rated current). Reducing the discharge current in this way suppresses the temperature rise, thus making it possible to prevent the temperature of the battery cells from reaching an upper temperature limit (for example, 80° C.) that is higher than the first preset value.

By making the discharge current less than or equal to the second current value, the temperatures of the battery cells gradually fall, and when the temperatures of all of the battery cells are at or below a second preset value (for example, 50° C.) that is a smaller value than the first preset value, the power converter 2' performs discharging while restoring the discharge current to the first current value.

On the other hand, when it is not possible to suppress a temperature rise of the battery cells even though the discharge current is controlled to the second current value or less, and the temperature of any battery cell reaches the upper temperature limit, the power converter 2' stops discharging and sends a discharge completion signal to the battery monitoring circuit 4.

Upon receiving the discharge completion signal, the battery monitoring circuit 4 sets the switching device 5 to the open state to cut the electrical connection between the power converter 2 and the battery apparatus 1.

As described above, with the power storage system according to this embodiment, because the discharge current is controlled while monitoring the temperatures of the battery cells, it is possible to further improve safety.

In this embodiment, discharging is performed based on the second current value when the temperature of any battery cell is equal to or greater than the first preset value. Instead of this, however, a temperature drop of the battery cell can be achieved by temporarily stopping discharging. Temporarily stopping discharging of the battery apparatus 1 in this way makes it possible to effectively suppress a rise in temperature of the battery cells.

In this embodiment, discharging is performed at the first current value in a period during which the temperatures of the battery cells increase from the second preset value to the first preset value. Instead of this, however, discharging may be performed at a current value according to the load 3 during this period. Accordingly, by supplying power from the battery apparatus 1 to the load at a current according to the load 3 in the period during which the temperature rises from the second preset value to the first preset value, it is possible to efficiently perform discharging while ensuring safety.

Fourth Embodiment

Next, a power storage system according to a fourth embodiment of the present invention will be described with reference to FIGS. 5 and 6.

The power storage system according to the first embodiment described above discharges power from the battery apparatus 1 to the load 3 by operating the power converter 2. In this embodiment, however, instead of operating the power converter 2, discharging of the battery apparatus 1 is performed by operating a cell balance circuit (voltage equalizing circuit) 7 provided in correspondence to each battery cell. The power storage system according to this embodiment is described below.

In this embodiment, the cell balance circuits 7 are provided in correspondence to the respective battery cells in a battery unit 10'. An example configuration of the cell balance circuit 7 is shown in FIG. 6. As shown in this figure, the cell balance circuit 7 includes, as main components, a resistance 11 connected in parallel to the battery cell and a switching device 12 connected in series with the resistance 11.

When the battery monitoring circuit 4' detects an abnormality in the battery cell, it sets the switching device 5 to the open state, thereby cutting the electrical connection between the battery apparatus 1 and the power converter 2.

Then, the battery monitoring circuit 4' sets the switching devices 12 of the cell balance circuits provided in correspondence to all battery cells to the closed state, thereby operating the cell balance circuits 7. Accordingly, current flows from all of the battery cells to the resistances 11 in the cell balance circuits 7, and discharging is performed.

When the terminal voltages of the battery cells are equalized at a rated voltage level (for example, 3.1 V), the battery monitoring circuit 4' sets the switching devices 12 in the cell balance circuits 7 to the open state, thereby stopping the operation of the cell balance circuits 7.

As described above, with the power storage system according to this embodiment, when a battery cell abnormality is detected, discharging is performed while operating the cell balance circuits 7; therefore, it is possible to perform discharging such that the terminal voltages of all battery cells are at the same level.

Also, because discharging is performed by using the existing cell balance circuits 7 which are generally provided in correspondence to each battery cell, it can be realized in a straightforward manner without the addition of new components.

Figure 6:
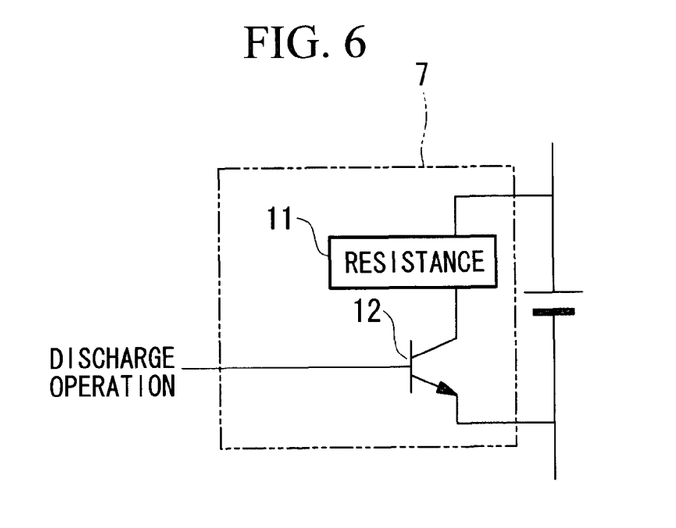
FIG. 6 is a diagram showing an example configuration of a cell balance circuit shown in FIG. 5.

Though the cell balance circuits 7 using the resistance 11 and the switching device 12 shown in FIG. 6 are assumed in the embodiment described above, instead of this, cell balance circuits using transformers may be employed. A transformer-type cell balance circuit performs equalization of the terminal voltages of the battery cells by transferring the power in one battery cell to another battery cell. In this case, when the voltage of a battery cell in which an abnormality is detected is high, by transferring its power to another normal battery cell with a low voltage, it is possible to reduce only the terminal voltage of the battery cell in which the abnormality is detected.

The cell balance circuit 7 is not limited to the configuration described above; it is possible to employ any known cell balance circuit that is effective in extracting the power in one battery cell and transferring it to another battery cell. It is preferable to employ a cell balance circuit that can control the value of the discharge current during this process. By employing such a cell balance circuit, it is possible to perform discharging while increasing safety.

Fifth Embodiment

Next, a fifth embodiment of the present invention will be described with reference to FIG. 7.

Figure 7:
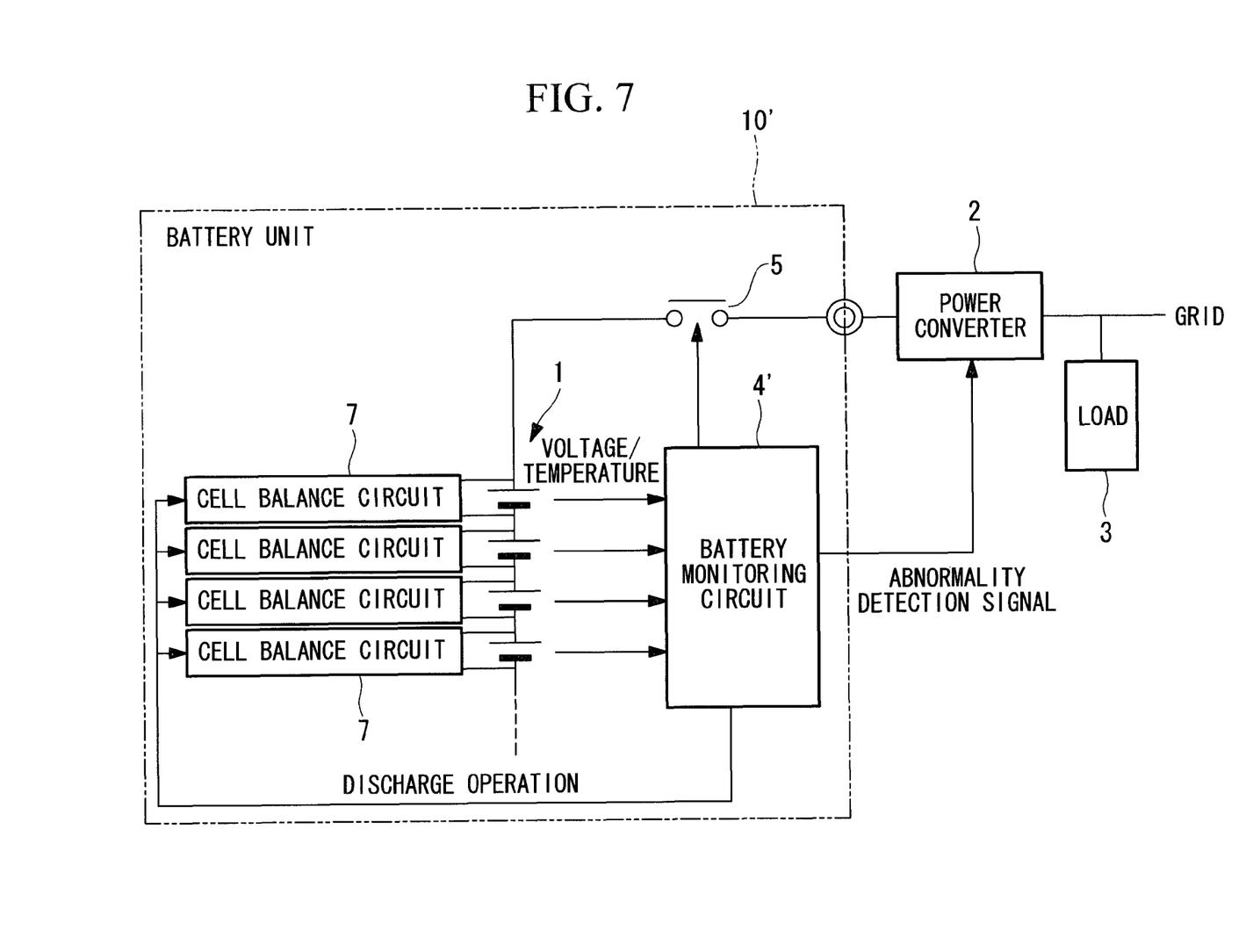
FIG. 7 is a diagram showing, in outline, a power storage system according to a fifth embodiment of the present invention.

Instead of the battery unit 10 in the power storage system according to the second embodiment described above, the power storage system according to this embodiment employs the battery unit 10' of the power storage system according to the fourth embodiment, shown in FIG. 7.

With the power storage system according to this embodiment, for example, when an abnormality is detected by the battery monitoring circuit 4', discharging to the load 3 is performed by the power converter 2, similarly to the second embodiment described above. When the voltage of the battery apparatus 1 becomes a predetermined value or less due to this discharging, a discharge stopping signal is sent from the battery monitoring circuit 4' to the power converter 2. Upon receiving the discharge stopping signal, the power converter 2 stops discharging the battery apparatus 1 and sends a discharge completion signal to the battery monitoring circuit 4'.

Upon receiving the discharge completion signal, the battery monitoring circuit 4' sets the switching device 5 to the open state, thereby cutting the electrical connection between the battery apparatus 1 and the power converter 2, and thereafter, it operates all of the cell balance circuits 7. Accordingly, the terminal voltages of the battery cells are equalized. When current no longer flows in all of the cell balance circuits 7, the battery monitoring circuit 4 sets the switching devices 12 inside the cell balance circuits 7 to the open state to stop operating the cell balance circuits 7.

With the power storage system according to this embodiment, by a combination of discharging to the load 3 by the power converter 2 in units of the battery apparatus 1 and discharging in units of battery cells using the cell balance circuit 7, it is possible to complete discharging of the battery apparatus 1 in a short time compared with the power storage system according to the fourth embodiment described above.

Furthermore, by performing discharging using the cell balance circuit 7 after discharging to the load 3, it is possible to eliminate nonuniform terminal voltages of the battery cells.

Figure 5:
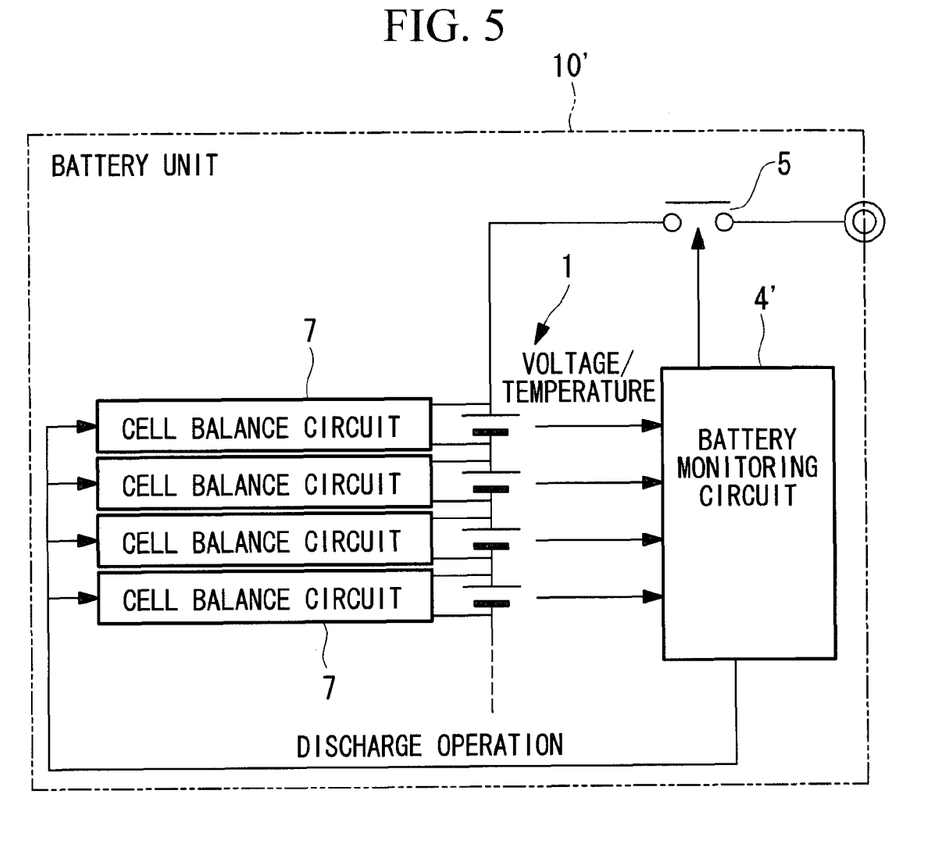
FIG. 5 is a diagram showing, in outline, a power storage system according to a fourth embodiment of the present invention.

Similarly to this embodiment, instead of the battery unit 10 of the power storage system according to the first embodiment, the battery unit 10' shown in FIG. 5 may be used. The discharging procedure and method are the same as described above.

Figure 8:
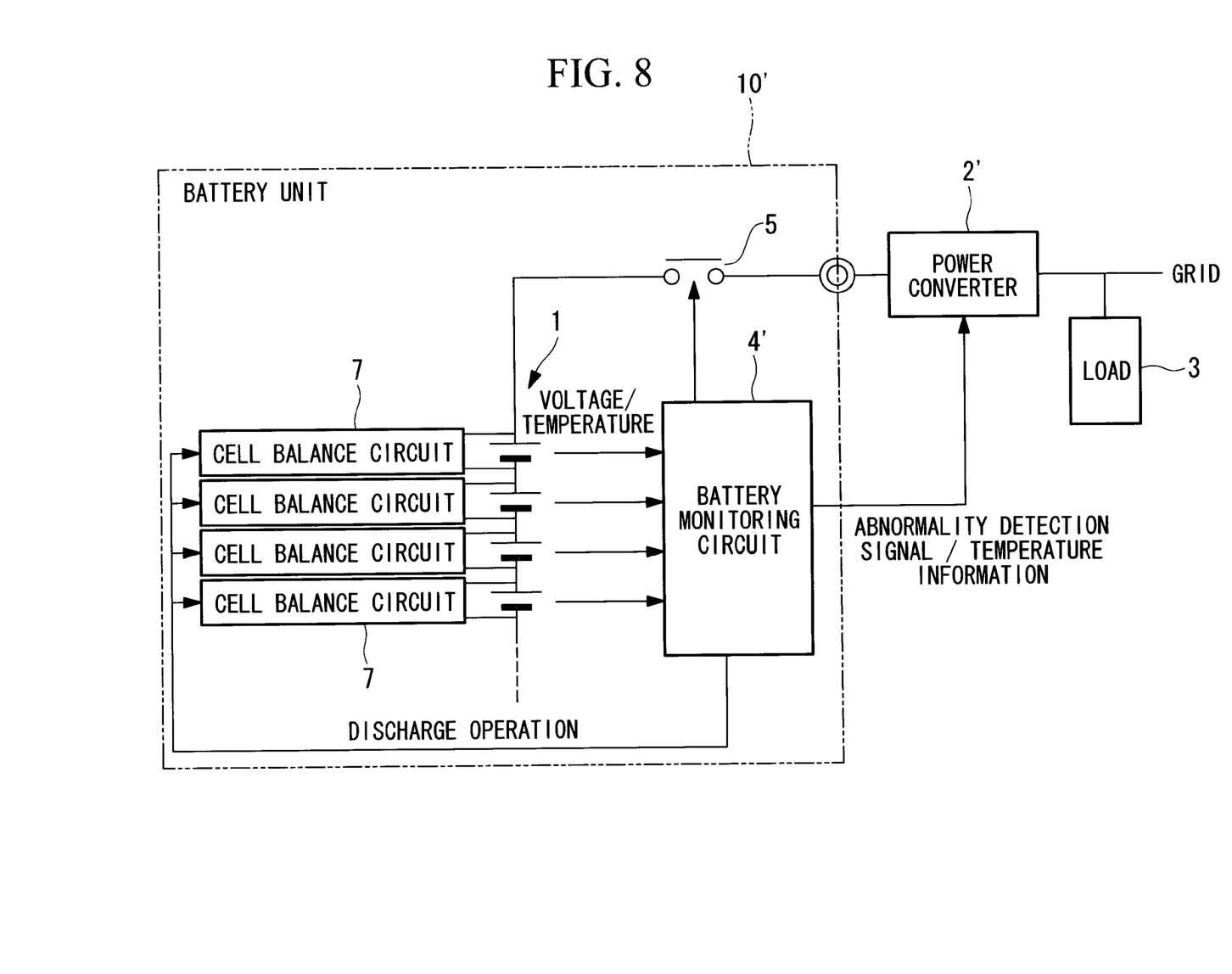
FIG. 8 is a diagram showing a modification of the power storage system according to the fifth embodiment of the present invention

As shown in FIG. 8, in the power storage system according to the third embodiment in which the temperature information of each battery cell is sent to the power converter 2', the battery unit 10' shown in FIG. 5 may be used instead of the battery unit 10.

In this case, discharging may be performed according to the load 3 without limiting the discharge current, for example, until the temperature of any battery cell reaches the first preset value described above, and when the temperature of any battery cell reaches the first preset value, discharging by the power converter 2' may be stopped, then the switching device 5 may be set to the open state to cut the electrical connection between the battery apparatus 1 and the power converter 2', and thereafter the cell balance circuits 7 may be operated to eliminate nonuniform terminal voltages of the battery cells.

The cell balance circuits 7 described above may be configured so that discharging of each battery cell is possible even after achieving equalization of the terminal voltages of the battery cells. Accordingly, for battery cells other than the battery cells whose temperature has reached the first preset value, discharging can be continuously realized. As a result, for battery cells other than the battery cells whose temperature has reached the first preset value, it is possible to set the terminal voltage to a desired value or less, and it is thus possible to improve safety.

Although the embodiments of the present invention have been described above with reference to the drawings, the actual configuration is not limited to these embodiments; design modifications that do not depart from the spirit of the present invention are also encompassed.

The invention claimed is:

1. A power storage system comprising:
   a battery apparatus;
   a power converter that is provided between the battery apparatus and a load and that can control power supplied from the battery apparatus to the load; and
   a battery monitoring circuit that detects an abnormality in the battery apparatus,
   wherein when an abnormality in the battery apparatus is detected by the battery monitoring circuit, the power converter supplies power stored in the battery apparatus to the load or to an internally provided internal load at or below a current value or power value that is set in advance, or alternatively, at a current value or power value that the load demands, within a range that does not exceed an upper limit that is set in advance.

2. A power storage system according to claim 1, further comprising:
   a switching unit that electrically connects and disconnects the battery apparatus and the power converter,
   wherein, when the voltage of the battery apparatus is at or below a predetermined value, the battery monitoring circuit operates the switching unit to cut the electrical connection between the battery apparatus and the power converter.

3. A power storage system according to claim 1, further comprising:
   a temperature detector that detects the temperature of the battery apparatus,
   wherein the power converter varies a discharge current value according to the temperature of the battery apparatus.

4. The power storage system according to claim 3 wherein, when the temperature of the battery apparatus reaches an upper temperature limit, the power converter stops discharging.

5. A power storage system according to claim 1, wherein:
   the battery apparatus includes a plurality of battery cells connected in series;
   each battery cell is provided with a voltage equalizing circuit that is controlled by the battery monitoring circuit; and
   when the voltage of the battery apparatus is at or below a predetermined value due to discharging being performed by the power converter, the battery monitoring circuit operates each of the voltage equalizing circuits.

6. A power storage system according to claim 4, wherein:
   the battery apparatus includes a plurality of battery cells connected in series;
   each battery cell is provided with a voltage equalizing circuit that is controlled by the battery monitoring circuit; and
   after the power converter stops discharging, the battery monitoring circuit operates each of the voltage equalizing circuits.

7. A power storage system comprising:
   a battery apparatus including a plurality of battery cells connected in series;
   voltage equalizing circuits, provided in correspondence to each battery cell, that equalize cell voltages among the battery cells; and
   a battery monitoring circuit that detects an abnormality in each battery cell,
   wherein when the battery monitoring circuit detects an abnormality in the battery cells, at least the voltage equalizing circuit corresponding to the battery cell in which the abnormality is detected is operated to perform discharging of the battery cell in which the abnormality is detected at or below a current value that is set in advance.

8. A power storage system according to claim 7, further comprising:
a temperature detector that detects the temperature of each of the battery cells,
wherein the battery monitoring circuit controls a discharge current value according to the temperatures of the battery cells.

9. A power storage system according to claim 7, wherein the voltage equalizing circuit is a transformer-type circuit that supplies energy in the battery cell in which the abnormality is detected to another normal battery cell via a transformer.

* * * * *